(12) United States Patent
Wang (10) Patent No.: US 10,289,695 B2
(45) Date of Patent: May 14, 2019

(54) COMPUTERIZED SYSTEM AND METHOD FOR PERFORMING A LOCATION-BASED SEARCH

(71) Applicant: Alibaba Group Holding Limited, Grand Cayman (KY)

(72) Inventor: Lifeng Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 453 days.

(21) Appl. No.: 15/085,023

(22) Filed: Mar. 30, 2016

(65) Prior Publication Data

US 2016/0306823 A1 Oct. 20, 2016

(30) Foreign Application Priority Data

Apr. 20, 2015 (CN) .......................... 2015 1 0192283

(51) Int. Cl.
*G06F 17/30* (2006.01)

(52) U.S. Cl.
CPC .. *G06F 17/30241* (2013.01); *G06F 17/30321* (2013.01)

(58) Field of Classification Search
CPC ......... G06F 17/30241; G06F 17/30321; G06F 17/30622
See application file for complete search history.

(56) References Cited

U.S. PATENT DOCUMENTS

| | | | |
|---|---|---|---|
| 7,774,002 B1 | 8/2010 | Ortega et al. | |
| 7,859,402 B2 | 12/2010 | Miller et al. | |
| 8,078,197 B2 | 12/2011 | Gutierrez et al. | |
| 8,364,689 B2 | 1/2013 | Hao | |
| 8,386,514 B2 | 2/2013 | Cheng et al. | |
| 8,396,888 B2 | 3/2013 | Cheng et al. | |

(Continued)

FOREIGN PATENT DOCUMENTS

| | | |
|---|---|---|
| CA | 2648191 | 7/2009 |
| EP | 1960919 A1 | 8/2008 |

OTHER PUBLICATIONS

International Search Report and Written Opinion dated Jun. 23, 2016 to corresponding International Application No. PCT/US16/25161 (2016).

*Primary Examiner* — Noosha Arjomandi
(74) *Attorney, Agent, or Firm* — James J. DeCarlo; Greenberg Traurig, LLP (57) ABSTRACT

Disclosed are systems and methods for improving interactions with and between computers in location-based search systems supported by or configured with personal computing devices, servers and/or platforms. The systems interact to identify and retrieve data within or across platforms, which can be used to improve the quality of data used in processing interactions between or within such systems. The disclosed systems and methods identify a first geographic location that has a corresponding location identifier. Based on the first identifier, a set of identifiers are identified, where the identifier set corresponds to adjacent locations to the first location. In some embodiments, the identifier set can correspond to locations that are directly and/or indirectly adjacent to the first location. A search is then performed respective to the set of identifiers, whereby based on a distance calculation respective to such search in line with the set of identifiers, a search result is determined.

20 Claims, 6 Drawing Sheets

(56) References Cited

U.S. PATENT DOCUMENTS

| | | | |
|---|---|---|---|
| 8,437,778 | B1 | 5/2013 | Ortega et al. |
| 8,442,969 | B2 | 5/2013 | Gross |
| 8,965,407 | B2 | 2/2015 | Dave et al. |
| 9,189,496 | B2* | 11/2015 | Egnor ................. G06F 17/3087 |
| 9,230,033 | B2 | 1/2016 | Yahyaoui et al. |
| 2006/0218114 | A1 | 9/2006 | Weare et al. |
| 2009/0233623 | A1* | 9/2009 | Johnson ................. H04W 4/02 |
| | | | 455/456.3 |
| 2011/0072005 | A1 | 3/2011 | Vechersky |
| 2012/0051649 | A1* | 3/2012 | Saund ................. G06K 9/2054 |
| | | | 382/195 |
| 2012/0226889 | A1 | 9/2012 | Merriman et al. |
| 2013/0013661 | A1 | 1/2013 | Inakoshi et al. |
| 2014/0250141 | A1 | 9/2014 | Pfeifle |
| 2015/0019531 | A1 | 1/2015 | Bursey |
| 2015/0134646 | A1 | 5/2015 | Dave et al. |
| 2016/0048568 | A1* | 2/2016 | Silverberg .......... G06F 17/3087 |
| | | | 707/734 |
| 2017/0332201 | A1* | 11/2017 | Zhang ................... H04L 5/1438 |
| 2018/0159805 | A1* | 6/2018 | Jones ...................... H04L 51/16 |
| 2018/0176644 | A1* | 6/2018 | Lopez ............. H04N 21/25875 |

\* cited by examiner

| 2 | 2 | 2 | 2 | 2 | 2 | 2 |
|---|---|---|---|---|---|---|
| 2 | 1 | 1 | 1 | 1 | 1 | 2 |
| 2 | 1 | 0 | 0 | 0 | 1 | 2 |
| 2 | 1 | 0 | D | 0 | 1 | 2 |
| 2 | 1 | 0 | 0 | 0 | 1 | 2 |
| 2 | 1 | 1 | 1 | 1 | 1 | 2 |
| 2 | 2 | 2 | 2 | 2 | 2 | 2 |

FIG. 2B

| 2 | 2 | 2 | 2 | 2 | 2 | 2 |
|---|---|---|---|---|---|---|
| 2 | 1 | 1 | 1 | 1 | 1 | 2 |
| 2 | 1 | 0 | 0 | 0 | 1 | 2 |
| 2 | 1 | 0 | D | 0 | 1 | 2 |
| 2 | 1 | 0 | 0 | 0 | 1 | 2 |
| 2 | 1 | 1 | 1 | 1 | 1 | 2 |
| 2 | 2 | 2 | 2 | 2 | 2 | 2 |

|   |   |   |   |   |
|---|---|---|---|---|
| 1 | 1 | 1 | 1 | 1 |
| 1 | 0 | 0 | 0 | 1 |
| 1 | 0 | D | 0 | 1 |
| 1 | 0 | 0 | 0 | 1 |
| 1 | 1 | 1 | 1 | 1 |

FIG. 3B

|   |   |   |
|---|---|---|
| 0 | 0 | 0 |
| 0 | D | 0 |
| 0 | 0 | 0 |

FIG. 4

COMPUTERIZED SYSTEM AND METHOD FOR PERFORMING A LOCATION-BASED SEARCH

CROSS-REFERENCE TO RELATED APPLICATIONS

This application claims the benefit of priority from Chinese Patent Application No. 201510192283.9, filed on Apr. 20, 2015, entitled "Search Method Based on Location Information and Search System Thereof," which is incorporated herein in its entirety by reference.

TECHNICAL FIELD

The present disclosure generally relates to improving the performance of content searching, generating, providing and/or hosting computer systems and/or platforms, and more particularly, to location-based search methods and systems.

BACKGROUND

Existing solutions for providing location based search (LBS) capabilities have many disadvantages. For example, conventional LBS systems typically require several full seconds or even tens of seconds to perform a search, retrieval and communication of desired information. Therefore, there exists a need for improved systems and methods that search, identify and communicate information (e.g., return search results) to people (or users) more efficiently and accurately.

SUMMARY

According to some embodiments, the present disclosure provides location-based search systems and methods that greatly reduce the quantity of processed data when performing a search for content, which ultimately, among other advantages, improves overall search and retrieval speeds.

In order to solve existing technical problems in conventional search and LBS systems, an embodiment of the present disclosure includes a location-based search method, where a region identifier corresponding to location information of each target in a retrieval system is preset, and the method includes the following steps:

acquiring a corresponding first region identifier according to first location information of a first target;

acquiring various adjacent region identifiers of the first region identifier;

querying, in the retrieval system, a target set having the first region identifier and the acquired various adjacent region identifiers; and conducting a conditional retrieval in the target set and obtaining a search result, which according to some embodiments, as discussed herein, can include any type of content related to a target(s) within the target set.

According to some embodiments of the present disclosure, a system is disclosed where a region identifier corresponding to location information of each target in a retrieval system is preset, and the system includes:

a first acquiring module, implemented by a process of a computing device, configured to acquire a corresponding first region identifier according to first location information of a first target;

a second acquiring module, implemented by a processor of the computing device, configured to at least acquire various adjacent region identifiers of the first region identifier;

a querying module, implemented by a processor of the computing device, configured to query, in the retrieval system, a target set having the first region identifier and various adjacent region identifiers acquired by the second acquiring module; and a retrieval module, implemented by a processor of the computing device, configured to conduct a conditional retrieval in the target set and obtain a search result.

In accordance with one or more embodiments, a system is provided that comprises one or more computing devices (also referred to as a "device") configured to provide functionality in accordance with such embodiments. In accordance with one or more embodiments, functionality is embodied in steps of a method performed by at least one computing device. In accordance with one or more embodiments, program code (or program logic) is executed by a processor(s) of a computing device to implement functionality in accordance with one or more such embodiments is embodied in, by and/or on a non-transitory computer-readable medium.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method as discussed herein.

Compared with the existing LBS systems, some embodiments of the present disclosure have, for example, the following, non-limiting, differences and effects:

According to some embodiments, a search method of the present disclosure involves a region identifier being preset for each target in a retrieval system, where a target set of a required region is queried during retrieval according to the region identifiers, and then a conditional retrieval (e.g., search and identification) is conducted in the target set. In this way, the quantity of processed data is reduced, and the search speed is improved, thereby providing a user with better search and content retrieval service.

According to some embodiments, a Geohash value signifying a region having a determined size (e.g, satisfying a size threshold so that the region is "large enough") is selected so that the current region and an adjacent region cover the search range and that during a search query, the required target set may be found only by finite pairings. Therefore, the search speed is greatly increased over those in conventional search systems.

According to some embodiments, adequate regions having a fixed region radius are acquired according to a search range to cover the search range for ease of treatment.

According to some embodiments, by establishing an inverted index for the region identifiers in the retrieval system, the target set may be quickly queried from the region identifiers, thereby further improving the search speed.

According to some embodiments, after the target set is queried, distances between various targets and the current target are further calculated, and a more accurate search result may be acquired.

According to some embodiments, different types of location information may be selected according to application scenarios.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE EMBODIMENTS

In the following disclosure, the technical details are put forward so that one of ordinary skill in the art would understand the disclosed systems and methods. It should be understood that those of ordinary skill in the art may understand that the technical solutions discussed herein may also be implemented even without these technical details or various variations and modifications based on the embodiments discussed herein.

To achieve the objectives of the present disclosure (e.g., address and solve the existing technical problems in conventional LBS systems), the instant disclosure provides non-limiting embodiments of the present disclosure with reference to the accompanying drawings.

Figure 1:
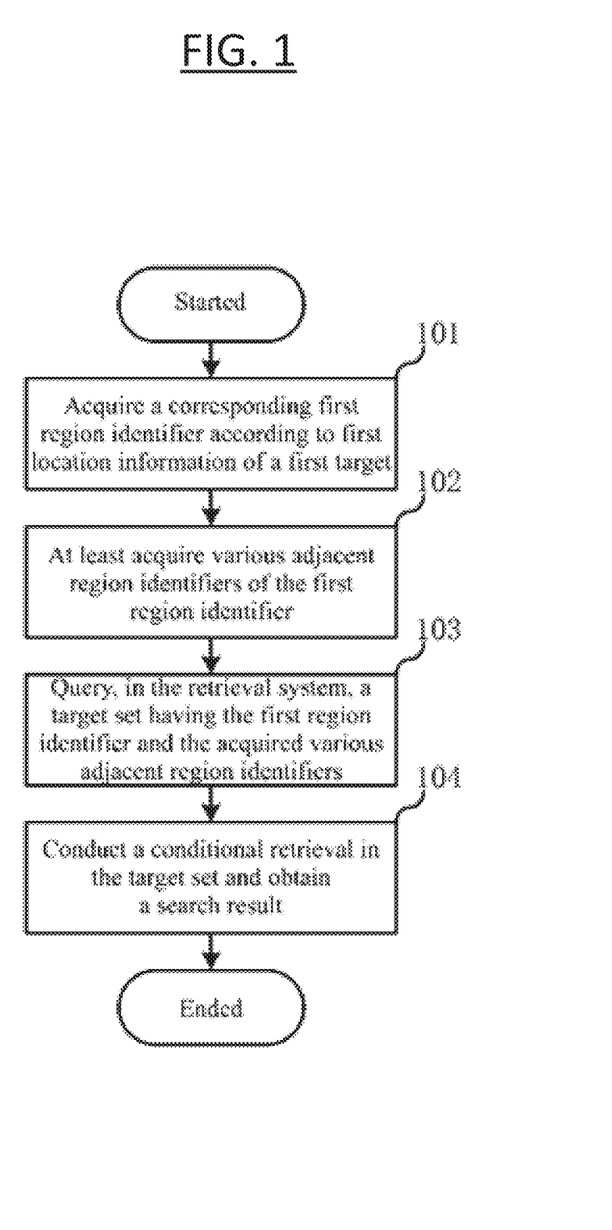
FIG. 1 is a schematic flow diagram of a location-based search process according to some embodiments of the present disclosure.

According to some embodiments of the present disclosure, FIG. 1 details a schematic flow diagram of a location-based search process. In the location-based search process, as discussed below, a region identifier corresponding to location information of each target in a retrieval system is preset. It should be understood that the foregoing target may be a person or an object, for example, a nearby shopping mall, a public facility, or any other type of known or to be known real-world entity. As shown in FIG. 1, the foregoing process includes the following steps:

In Step 101, a first region identifier is acquired, determined, derived or otherwise identified. The acquiring of the first region identifier in Step 101 is in accordance with first location information of a first target. Such acquiring can be based on a request for content, or a determination to send information to a user based on the user's identified location (whether it is automatically determined or provided by the user).

It should be understood that in some embodiments of the present disclosure, the location information can be, but is not limited to, longitude and latitude coordinates, a WIFI® fingerprint or a Bluetooth® fingerprint. It would be understood by those of ordinary skill in the art that any known or to be known type of location information or data (or metadata) may be selected, determined or utilized according to any known or to be known technique, algorithm or mechanism without departing from the scope of the instant disclosure. For example, location information of longitude and latitude coordinates can be used outdoors, whereas location information of a WIFI fingerprint or of a Bluetooth fingerprint can be used indoors, and the like.

It should be understood by those of skill in the art that the Bluetooth fingerprint refers to a combination of intensities of Bluetooth signals detected at one location. Different locations have different combinations of intensities of Bluetooth signals, whereby the coordinate(s) of the current location may be calculated. A WIFI fingerprint is similar to a Bluetooth fingerprint, but the difference is in the type of wireless communication.

By way of non-limiting example, according to some embodiments of the present disclosure, the current location coordinate may be calculated according to a WIFI fingerprint or a Bluetooth fingerprint, and then a region identifier is calculated according to the location coordinate. In another non-limiting example, according to some embodiments of the present disclosure, a region identifier may be directly calculated according to a WIFI fingerprint or a Bluetooth fingerprint. In this case, a mapping table between the WIFI fingerprint or the Bluetooth fingerprint and the region identifier may be pre-established. The mapping table is queried according to a combination of intensities of WIFI or Bluetooth signals received at the current location (i.e., first location information), and the corresponding region identifier is obtained by calculation according to a query result.

In Step 102, at least one adjacent region identifier of the first region identifier is acquired. In some embodiments, the acquired adjacent region identifier can be a single identifier associated with a single location, and in some embodiments, the acquiring occurring in Step 102 can involve acquiring a plurality of adjacent region identifiers associated with a plurality of adjacent regions to the first target. In some embodiments, it would be understood by those of skill in the art that the acquiring occurring in Step 102 can involve any known or to be known type of region identification, determination and derivation algorithm, technique and/or mechanism.

Figure 2A:
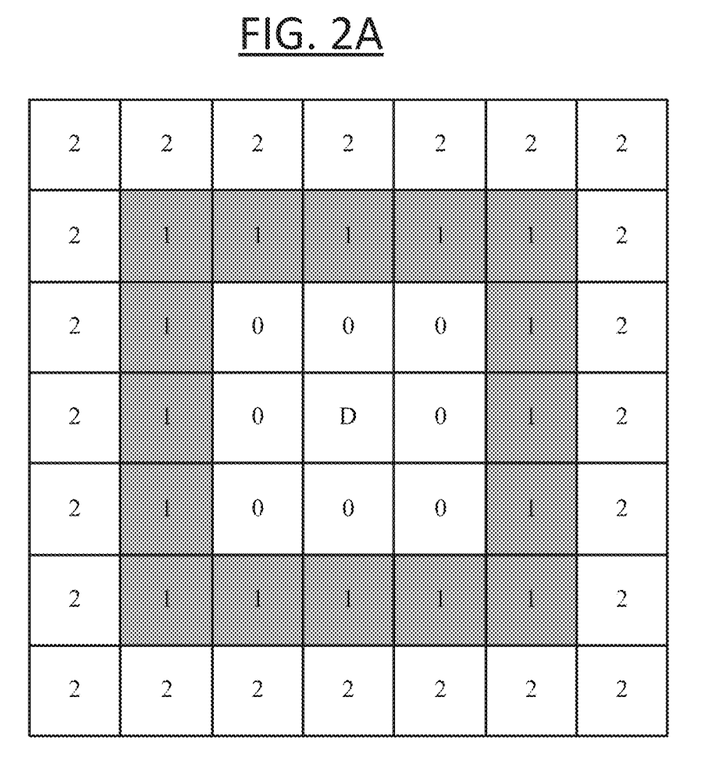
FIGS. 2A-2C illustrate non-limiting schematic diagrams of a first region and adjacent regions according to some embodiments of the present disclosure.
Figure 2B:
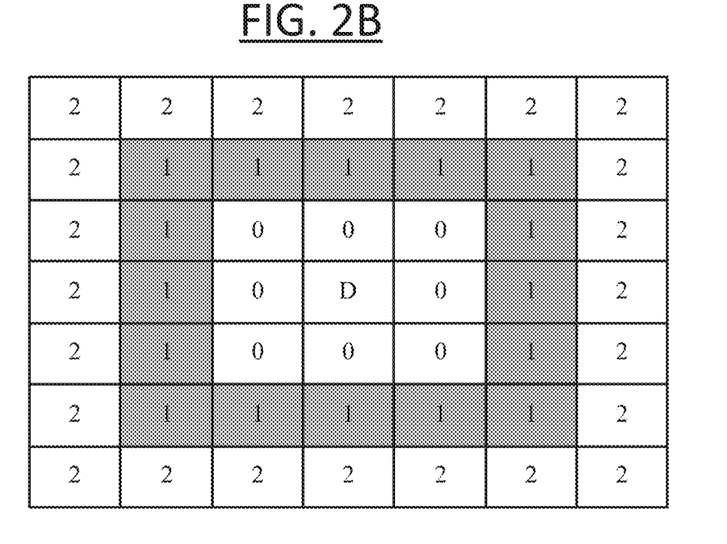
Figure 2C:
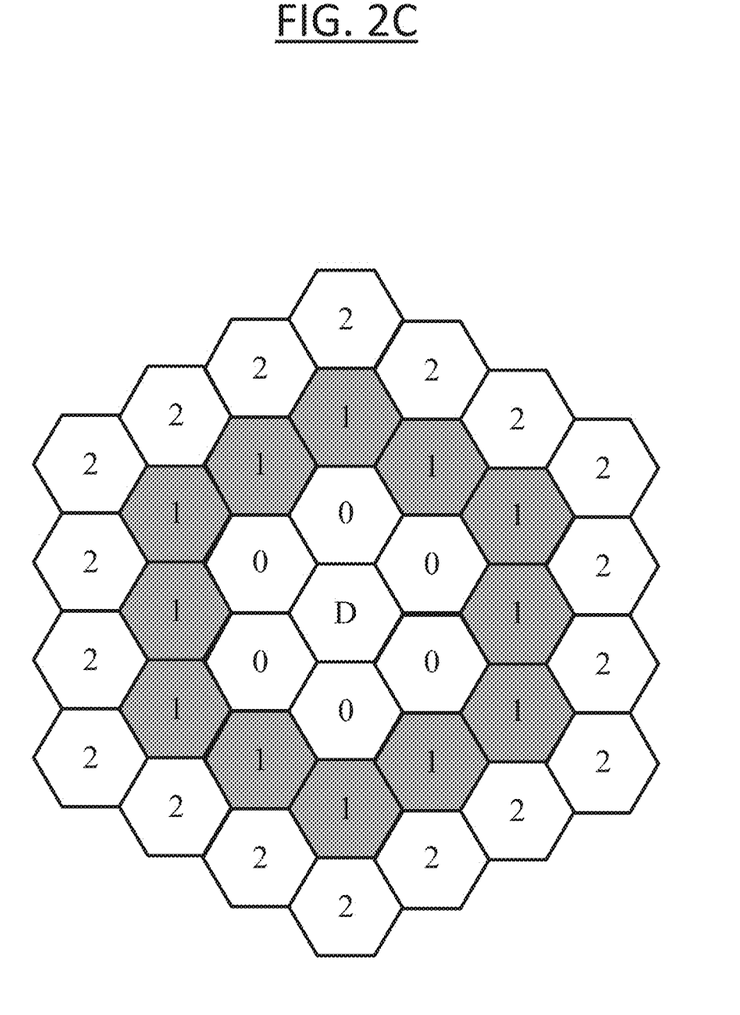

According to some embodiments, the first region in Step 102 may either be directly adjacent or indirectly adjacent (for example, separated by one or a plurality of regions) to various adjacent regions. By way of a non-limiting example, as illustrated in FIGS. 2A-2B, eight regions are marked as "0". In another example, as illustrated in FIG. 2C, six regions are marked as "0." These "0" marked regions indicate that those regions are directly adjacent to a first region "D". As also illustrated in FIGS. 2A-2C, the regions marked as "1" and "2" indicate that such regions are indirectly adjacent to the first region "D" and are respectively separated by one region and two regions. According to some embodiments, the shape of a region may be a square, a rectangle, a hexagon as shown in FIGS. 2A-2C or any other selected known or to be known shape, as needed. In addition, it should be understood that while the examples FIGS. 2A-2C only show regions separated by two regions, the disclosed systems and methods are not limited thereto, as any number of region separations can occur.

According to some embodiments of the instant disclosure, the first region identifier and adjacent region identifiers may be selected via following two manners (or embodiments).

In a first manner, according to some embodiments, adequate regions having a fixed region radius are acquired according to a search range that satisfies an ease of treatment threshold. In some embodiments, the region identifiers can have a fixed region radius.

Figure 3A:
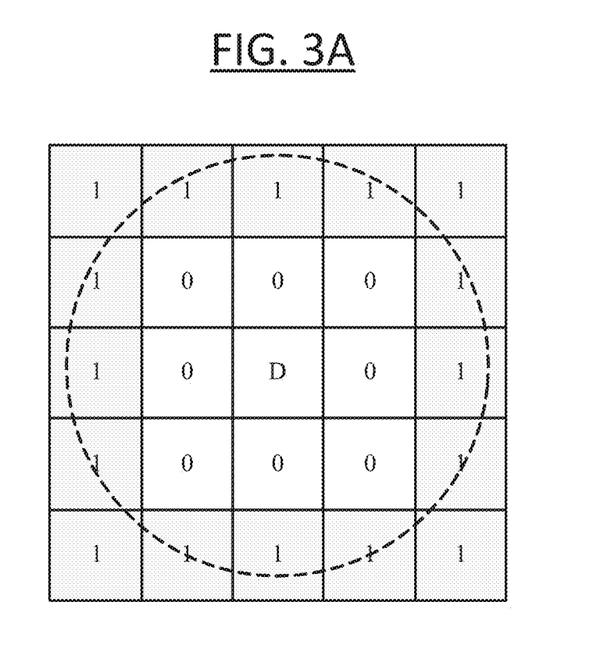
FIGS. 3A-3B illustrate non-limiting schematic diagrams of two embodiments for selecting a first region identifier and adjacent region identifiers according to some embodiments of the present disclosure.

Thus, in Step 102, at least various adjacent region identifiers of the first region identifier are acquired according to the search range. The search range is covered, or in accordance with the first region and various adjacent regions signified by the first region identifier and the acquired various adjacent region identifiers. Each of the first region and the various adjacent regions covers at least a part of the search range. In some embodiments, the first region and the targeted adjacent regions completely cover the search range, and, in some embodiments, the first search region and any one of the regions in the targeted adjacent regions cover at least a portion of the search region. In some embodiments, the set of the first region and the targeted adjacent regions are greater than or equal to the search range, and, in some embodiments, the first region and any one of the targeted adjacent regions intersect with the search range. For example, as shown in FIG. 3A, a box having a dashed line running through it indicates a search range which is covered over by the first region D and regions marked as 0 and 1. In Step 102, region identifiers of regions marked as 0 and 1 are acquired, determined, or otherwise identified, as discussed above.

In the second manner, according to some embodiments, a region identifier (for example, a Geohash value) signifying a region satisfying a size threshold (e.g., a region "large enough") is selected so that the current region and an adjacent region thereof cover the search range and that during an executed search query, the required target set may be found only by finite pairings. Therefore, the search speed evidences an increased speed from those of conventional search systems.

According to some embodiments, the foregoing region identifiers may signify regions having different region radiuses. In some embodiments, the region identifier is a Geohash value; however, it should be understood that any type of known or to be known identifier and/or identifier value can be utilized without departing from scope of the instant disclosure.

According to the instant disclosure, as discussed herein and understood by those of skill in the art, Geohash is an existing address coding technology, in which, the longitude and latitude of any a point on the Earth is signified by a character string, which can be determined according to any known or to be known coding scheme, such as, for example, WX4ER, WX4G2 and WX4G3, and the like. The longer the character string representing a Geohash value is, the more accurate a range signified by it is. Geohash values having similar character string represent that the distance is proximate. Therefore, a certain number of Geohash values having a certain length (e.g., satisfying a length threshold) may be selected to ensure a threshold value of search speed and accuracy.

Therefore, according to some embodiments, in Step 101, a first Geohash value is selected according to a search range, as discussed above.

Figure 3B:
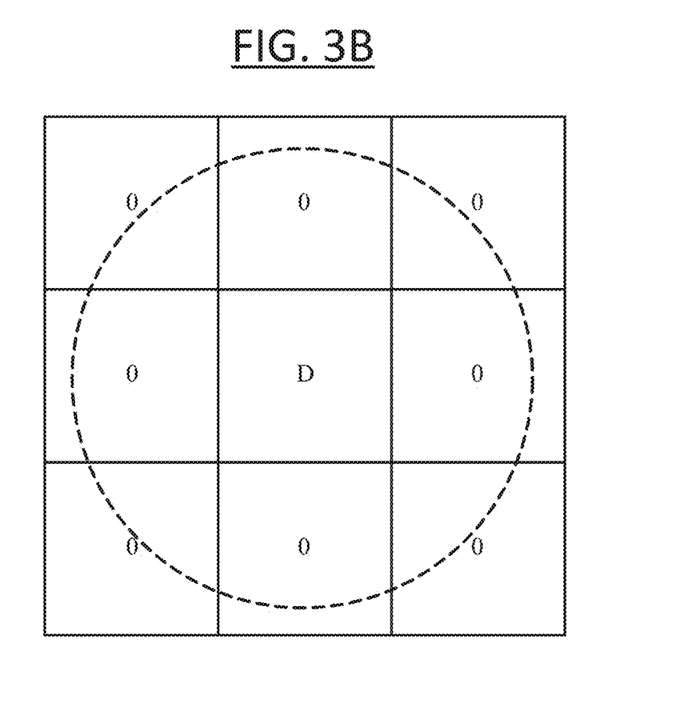

In Step 102, an adjacent Geohash value of the first Geohash value is acquired, where the first Geohash value and the adjacent Geohash value indicate a first region having a first region radius and an adjacent region, and the first region and the adjacent region cover the search range. For example, as shown in FIG. 3B, a dashed line within a box indicates a search range. As in Step 102, only region identifiers of the first region "D" and of the regions marked as "0" are acquired (in Step 101), and region identifiers of regions "large enough" (i.e., satisfying a size threshold, as discussed above) are acquired so that nine regions in FIG. 3B can cover the search range.

It should be understood that the disclosed examples illustrated in FIGS. 3A and 3B involve circular dashed line boxes to signify a search range. As discussed above, embodiments exist where the search range may be a square, a rectangle, or any other shape or form, which may be selected as needed.

In Step 103 a target set in the retrieval system is queried, where the target set includes targets corresponding to the first region identifier and the acquired various adjacent region identifiers.

According to some embodiments, an inverted index recording the corresponding relation between the region identifiers and the targets is established in the retrieval system. By establishing the inverted index in the retrieval system, the target set may be quickly queried based on the region identifiers, thereby further improving the search speed. Each target has a geographical position which corresponds to a region signified by a region identifier. Thus, each target corresponds to a region identifier. For example, the target set can refer to a set of targets, such as, but not limited to, merchants, people, buildings and the like, not just sets of region identifiers. In addition, it should be understood that in some embodiments of the present disclosure, a database comprising the target set may be queried via the inverted index.

In Step 104, a conditional retrieval respective to the target set is conducted in order to obtain a search result.

Figure 4:
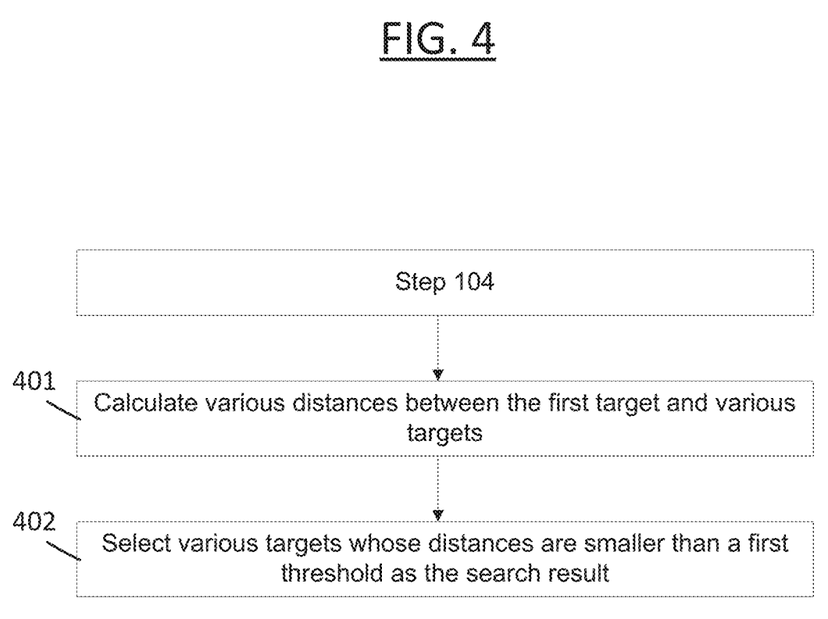
FIG. 4 is a schematic flow diagram of conditional retrieval steps in a location-based search process according to some embodiments of the present disclosure.

According to some embodiments, as shown in FIG. 4, Step 104 includes the following substeps:

In Substep 401, various distances between the first target and various targets are calculated according to first location information of the first target and location information of the various targets in the target set.

In Substep 402, various targets whose distances are smaller than a first threshold are selected as the search result. Thus, Step 402 involves comparing the distances of each target to the first threshold and those targets having distances less than the first threshold are selected as the search result.

Thus, after the target set is queried, distances between various targets and the current target are further calculated (or determined), which results in an increasingly accurate search result.

According to some embodiments of the instant disclosure, it should be understood that in various embodiments, the conditional retrieval may involve a distance retrieval related to particular entities (or targets) or surrounding a particular target location (e.g., a retrieval of a specific shopping mall or discount store, and the like, or some combination thereof). For example, in the search result obtained from the foregoing distance calculation, a five-star restaurant, a discount store or an available parking lot or the like can be further identified based on such locations being within the calculated distance to a target (or target set). In some embodiments, after the foregoing information is obtained by searching the target set, a further distance filtration can be performed on the information.

Afterward, Step 104 and the process of FIG. 1 are concluded.

Thus, as discussed above, according to some embodiments, a region identifier is preset for each target in the retrieval system (e.g., a target location is selected by a user, the system or some combination thereof, and the location's region identifier is identified), a target set of a required region is queried during a retrieval according to the region identifiers, then a conditional retrieval is conducted in the target set. In this way, the quantity of processed data is reduced, and the search speed is improved, thereby providing a user with better search and content retrieval service.

The following will describe in detail, via a non-limiting example, the systems and methods discussed above in relation to FIGS. 1-4, where nearby persons or objects within 1,000 meters are searched:

1. An inverted index is established by using Geohash values (i.e., region identifiers). It is known that the Earth is divided by longitude and latitude lines (i.e., location information), and the Earth is divided, according to lines of longitude and latitude, into numerous small rectangular blocks. Each small rectangular block on the Earth is coded into, for example, a Hash value (and the like) by means of an applied GeoHash algorithm. An inverted index is established (or determined) by using the Hash values inside a search engine. It is understood that in other embodiments of the present disclosure, other types of known or to be known region identifiers and location information may also be used, such as, but not limited to, a Geohash value and longitude and latitude and the like, as discussed above.

2. Continuing with the above example, the rectangular block where the current longitude and latitude are located is coded into a Hash value, and Hash values of eight rectangular blocks around the rectangular block are also generated (e.g., nine hash values: 8 values for the adjacent regions and 1 value for the first region). A retrieval process is conducted via an applied/implemented search engine by using the nine Hash values, and the retrieved result includes a person and/or an object within the nine rectangular blocks. In this way, the quantity of subsequently processed data is greatly reduced from that of conventional search systems. It should be understood that in other embodiments of the present disclosure any number Hash values may be selected to conduct an information search and retrieval (e.g., ten hash values). In addition, it should be understood that in other embodiments of the present disclosure, it is also practicable that an inverted index is not established, and a person or an object having a corresponding Hash value is queried by means of a database, as discussed above.

3. As such, from the above example, the distance between the current location and each person or object in the retrieved rectangular blocks is calculated, and persons or objects within a predetermined distance are selected (e.g., the distance calculation discussed above, for example 1 km). In some embodiments of the present disclosure, other types of target data, such as a specific shopping mall, a public facility or discount information or the like, may also be searched for each person or object in the retrieved rectangular blocks, as the above is a non-limiting example put forth for explaining a real-world application of the disclosed LBS systems and methods.

By using a search engine and by means of the process of one-step retrieval and one-step filtration, nearby persons or objects may be searched out in a millisecond, and with regard to massive quantities LBS positioning information (e.g., tens of millions), a search result may be retrieved the most quickly and efficiently compared to existing LBS systems.

It is understood that the foregoing various steps are merely preferred embodiments of the present disclosure. In other embodiments of the present disclosure, settings thereof may be changed as needed to search nearby persons or objects.

Various method embodiments of the present disclosure may be implemented by means of software, hardware and/or firmware, or any combination thereof (other than software per se). No matter whether the present disclosure is implemented by means of software, hardware or firmware, an instruction code (e.g., computer-executable instructions) may be stored in an any type of memory (for example, permanent or changeable, volatile or non-volatile, solid or non-solid, fixed or replaceable media, etc.) accessible to a computer. Similarly, a memory may be, for example, a programmable array logic (PAL), a random access memory (RAM), a programmable read only memory (PROM), a read-only memory (ROM), an electrically erasable programmable read-only memory (EEPROM), a magnetic disc, an optical disc, and a digital versatile disc (DVD), etc.

A computer can include, but is not limited to any computing device capable of sending or receiving signals, such as via a wired or wireless network, and/or capable of processing or storing signals such as, for example, a server, personal computing device, a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

Figure 5:
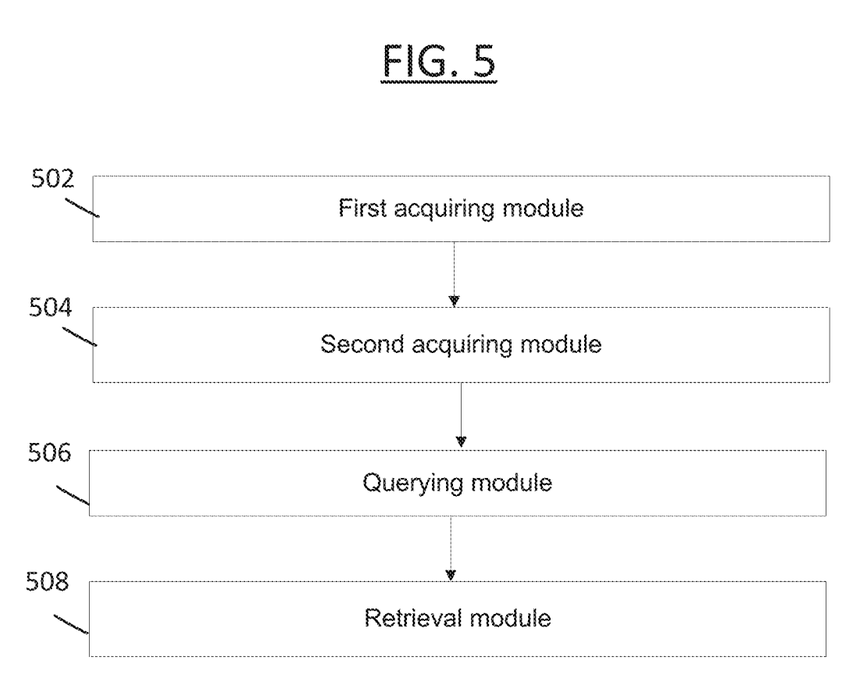
FIG. 5 is a schematic structural diagram of a location-based search system according to some embodiments of the present disclosure.

According to some embodiments, FIG. 5 illustrates a schematic structural diagram of the location-based search system.

FIG. 5 illustrates the components of a device, machine or processor, which can be a special purpose device, machine or processor, whereby such components can be hosted by a computing device(s). FIG. 5 collectively represents a principal processor, server, or combination of devices that comprises hardware programmed in accordance with the special purpose functions herein; and the device, machine or system illustrated by FIG. 5 includes, as discussed below, a first acquiring module 502, a second acquiring module 504, a querying module 506 and a retrieval module 508. It should be understood that the modules (or engines) discussed herein are non-exhaustive, as additional or fewer modules (or sub-modules or engines) may be applicable to the embodiments of the systems and methods discussed. The operations, configurations and functionalities of each module, and their role within embodiments of the present disclosure were discussed above in detail with reference to FIGS. 1-4, and are discussed below for clarity of disclosure.

A first acquiring module 502 is configured to, when executed by the processor of a computing device, acquire a corresponding first region identifier according to first location information of a first target. As discussed above, it is understood that the foregoing location information may be longitude and latitude, a WIFI fingerprint or a Bluetooth fingerprint.

A second acquiring module 504 is configured to, when executed by the processor of a computing device, at least acquire various adjacent region identifiers of the first region identifier, as discussed above. It is understood that the first region may either be directly adjacent or be indirectly adjacent (for example, separated by one or a plurality of regions) to various adjacent regions, as discussed above in relation to FIG. 1.

As discussed above, in some embodiments, the first region identifier and adjacent region identifiers thereof may be selected by means of the following two manners.

In the first manner, in some embodiments, adequate regions having a fixed region radius are acquired according to a search range to cover the search range for ease of treatment, as discussed above.

In some embodiments, the foregoing region identifiers signify regions having a fixed region radius, as discussed above.

The second acquiring module 504, when executed by the processor of a computing device, at least acquires various adjacent region identifiers of the first region identifier according to a search range, as discussed above. A first region and various adjacent regions signified by the first region identifier and the acquired various adjacent region identifiers, as discussed above, covers the search range, where any region of the first region and the various adjacent regions are part of the search range, as discussed above.

According to some embodiments, as discussed above, in the second manner, a region identifier (for example, a Geohash value) signifying a region satisfying a size threshold (e.g., a region "large enough") is selected so that the current region and an adjacent region thereof cover the search range and that during an executed search query, the required target set may be found only by finite pairings. Therefore, the search speed evidences an increased speed from those of conventional search systems According to some embodiments, the foregoing region identifiers may signify regions having different region radiuses, as discussed above. In some embodiments, the region identifier is a Geohash value.

In line with the discussion above respective to FIGS. 1-4, the first acquiring module 502 can select a first Geohash value according to the search range.

Similarly, the second acquiring module 504 acquires an adjacent Geohash value of the first Geohash value, where the first Geohash value and the adjacent Geohash value indicate a first region having a first region radius and an adjacent region, and the first region and the adjacent region cover the search range.

As discussed above, a certain number of Geohash values having a certain length may be selected according to requirements for the search accuracy and the search speed, and adaptability of the system.

A querying module 506 is configured to, upon execution by a processor of a computing device, query, in the retrieval system, a target set having targets corresponding to the first region identifier and various adjacent region identifiers acquired by the second acquiring module, as discussed above. In some embodiments, as discussed above, an inverted index is established for the region identifiers in the retrieval system. By establishing an inverted index for the region identifiers in the retrieval system, the target set may be quickly queried from the region identifiers, thereby further improving the search speed. As discussed above, it should be understood that in some embodiments of the present disclosure, a database comprising the target set of region identifiers may be queried via the inverted index. In addition, it is understood that in other embodiments of the present disclosure, a target set having region identifiers may be queried by means of a data base, not limited to the foregoing inverted index.

A retrieval module 508 is configured to, upon execution by a processor of a computing device, conduct a conditional retrieval in the target set and obtain or otherwise determine a search result.

According to some embodiments, the retrieval module 508 can include, as discussed in relation to FIG. 4:

A calculating sub-module configured to calculate various distances between the first target and various targets according to first location information of the first target and location information of various targets in the target set; and A selecting sub-module configured to select various targets whose distances are smaller than a first threshold as the search result.

After the target set is queried, distances between various targets and the current target are further calculated by the retrieval module 508.

Additionally, in some embodiments of the present disclosure, the conditional retrieval may be a distance retrieval related to particular entities (or targets) or surrounding a particular target location (e.g., a retrieval of a specific shopping mall or discount store, and the like, or some combination thereof, According to some embodiments, the search system discussed herein involves a region identifier being preset for each target in a retrieval system, where a target set of a required region is queried during retrieval according to the region identifiers, and then a conditional retrieval (e.g., search and identification) is conducted in the target set. In this way, the quantity of processed data is reduced, and the search speed is improved, thereby providing a user with better search and content retrieval service, as discussed above.

The first embodiment is a method embodiment corresponding to this embodiment which may be implemented in coordination with the first embodiment. Relevant technical details as mentioned in the first embodiment are still effective in this embodiment, which is not repeated anymore herein in order to reduce repetition. Correspondingly, relevant technical details as mentioned in this embodiment may be also applied to the first embodiment.

It should be explained that various modules as mentioned in device embodiments of the present disclosure are all logic modules. In physics, a logic module may be a physical module or a part of a physical module, or may be implemented by a combination of multiple physical modules. The physical implementation manner of these logic modules is not limited to those functions discussed herein, and a combination of functions implemented by these logic modules is the key to solve the technical problems addressed in the present disclosure. In addition, in order to highlight the innovation parts of the present disclosure, in the foregoing various device embodiments of the present disclosure, no module not closely related to solving the technical problems posed in the present disclosure is introduced, however, this does not mean that no other modules exist in the foregoing device embodiments.

It should be explained that as used herein, a relational term (such as a first or a second . . . ) is merely intended to separate one entity or operation from another entity or operation instead of requiring or hinting any practical relation or sequence exists among these entities or operations. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . . " do not exclude the fact that additional identical elements may exist in a process, a method, a merchandise or a device of these elements.

Although the present disclosure has been diagrammatized and depicted by reference to some preferred embodiments of the present disclosure, those of ordinary skill in the art should realize that various modifications of the present disclosure may be made in form and in detail without departing from the spirit and scope of the present disclosure.

What is claimed is:

1. A method comprising:
receiving, at a computing device, a request for content, said request comprising information about a current target;
identifying, via the computing device, a first identifier associated with a first region based on said current target;
determining, via the computing device, a second region that is geographically proximate to the first region, said determination further comprising:
determining a search range associated with said current target,
analyzing a geographic area proximate the first region,
identifying the second region based on the geographic area analysis, and
identifying a second identifier associated with the second region;
identifying, via the computing device, a first target set of targets in the first and the second region based on said first identifier and said second identifier;
searching, via the computing device, for a target within said target set, said search comprising calculating a distance between said current target and each of the targets in the first target set, and comparing said distance to a distance threshold, wherein said target is identified from said search upon said distance satisfying the distance threshold; and
communicating, via the computing device, information associated with the searched target.

2. The method of claim 1, wherein said searching further comprises:
establishing an inverted index of identifiers from the target set; and
searching a database of identifiers associated with locations based on said inverted index, wherein said searched target is identified based on said inverted index search of said database.

3. The method of claim 1, wherein said searched target is associated with at least one of person, a location or a real-world entity.

4. The method of claim 1, wherein the search range being covered or in accordance with the first region and the second region, each of the first region and the second region covers at least a part of the search range.

5. The method of claim 1, wherein said second region determination comprises:
determining a Geohash value of said first identifier; and
determining a second set of Geohash values based on said first Geohash value, wherein said second set of Geohash values correspond to said second region.

6. The method of claim 5, wherein said first Geohash value of said first identifier satisfies a size threshold.

7. The method of claim 5, wherein said second set determination comprises implementing a Geohash coding scheme.

8. The method of claim 1, wherein said second region comprises a plurality of locations, wherein each location is proximate to the first region.

9. The method of claim 1, wherein said second region comprises a second location that is proximate to the first region.

10. The method of claim 1, wherein said second region is adjacent to said first region.

11. The method of claim 1, further comprising:
determining said first identifier by analyzing coordinate information associated with said first region.

12. The method of claim 11, wherein said coordinate information is selected from a group consisting of: longitude and latitude coordinates, WiFi data and Bluetooth data.

13. The method of claim 1, further comprising:
determining a third region that is geographically proximate to the first region, said determination further comprising identifying a third identifier associated with the third region;
identifying a second target set of targets in the first and the second region based on said first identifier, said second identifier and said third identifier;
searching for said target within said second target set, said search comprising calculating distances between said current target and each of the targets in the first target set and between said current target in the second target set, and comparing the distances to the distance threshold; and
determining, based on said comparison, whether the distances for each comparison satisfies the distance threshold, wherein said communicated target information is associated with the at least one target that satisfies the distance threshold.

14. A non-transitory computer-readable storage medium tangibly encoded with computer-executable instructions, that when executed by the computing device, perform a method comprising:
receiving, at a computing device, a request for content, said request comprising current location information about a user;
identifying, via the computing device, a first identifier associated with a first region based on said information;
determining, via the computing device, a second region that is geographically proximate to the first region, said determination further comprising:
determining a search range associated with said current target,
analyzing a geographic area proximate the first region,
identifying the second region based on the geographic area analysis, and
identifying a second identifier associated with the second region;
identifying, via the computing device, a first target set of targets in the first and the second region based on said first identifier and said second identifier;
searching, via the computing device, for a target within said first target set, said search comprising calculating a distance between said user and each of the targets in the first target set, and comparing said distance to a distance threshold, wherein said target is identified from said search upon said distance satisfying the distance threshold; and
communicating, via the computing device, information associated with the searched target.

15. The non-transitory computer-readable storage medium of claim 14, wherein said searching further comprises:
establishing an inverted index of identifiers from the target set; and
searching a database of identifiers associated with locations based on said inverted index, wherein said searched target is identified based on said inverted index search of said database.

16. The non-transitory computer-readable storage medium of claim 14, wherein said second region determination comprises:
determining a search distance associated with said first region;

analyzing a geographic area proximate the first location according to the search distance for a location less than or equal to the search distance; and identifying said second region based on said geographic area analysis.

17. The non-transitory computer-readable storage medium of claim 14, wherein said second region determination comprises:

determining a Geohash value of said first identifier; and determining a second set of Geohash values based on said first Geohash value, wherein said second set of Geohash values correspond to said second region, wherein said first Geohash value of said first identifier satisfies a size threshold, and wherein said second set determination comprises implementing a Geohash coding scheme.

18. The non-transitory computer-readable storage medium of claim 14, further comprising:

determining a third region that is geographically proximate to the first region, said determination further comprising identifying a third identifier associated with the third region;

identifying a second target set of targets upon which said search for said targets in the first, second, and third region based on said first identifier, said second identifier and said third identifier;

searching for said target within said second target set, said search comprising calculating a distance between said user and each of the targets in the first target set and between the user and each of the targets in the second target set, and comparing the distance to the distance threshold; and determining, based on said comparison, whether the distances for each comparison satisfies the distance threshold, wherein said communicated target information is associated with the at least one target that satisfies the distance threshold.

19. A system comprising:

a processor;

a non-transitory computer-readable storage medium for tangibly storing thereon program logic for execution by the processor, the program logic comprising:

logic executed by the processor for receiving, at a computing device, a request for content, said request comprising information about a current target;

logic executed by the processor for identifying, via the computing device, a first identifier associated with a first region based on said information;

logic executed by the processor for determining, via the computing device, a second region that is geographically proximate to the first region, said determination further comprising:

determining a search range associated with said current target, analyzing a geographic area proximate the first region, identifying the second region based on the geographic area analysis, and identifying a second identifier associated with the second region;

logic executed by the processor for identifying, via the computing device, a first target set of targets in the first region and the second region based on said first identifier and said second identifier;

logic executed by the processor for searching, via the computing device, for a target within said target set, said search comprising calculating a distance between said current target and each of targets in the first target set, and comparing said distance to a distance threshold, wherein said target is identified from said search upon said distance satisfying the distance threshold; and logic executed by the processor for communicating, via the computing device, information associated with the identified target.

20. The system of claim 19, further comprising:

logic executed by the processor for determining a third region that is geographically proximate to the first region, said determination further comprising identifying a third identifier associated with the third region;

logic executed by the processor for identifying a second target set of targets based on said first identifier, said second identifier and said third identifier;

logic executed by the processor for searching for said target within said second target set, said search comprising calculating a distance between said current target and each of targets in the first target set and between the current target and each of targets in the second target set, and comparing the distance to the distance threshold; and logic executed by the processor for determining, based on said comparison, whether the distances for each comparison satisfies the distance threshold, wherein said communicated target information is associated with the at least one target that satisfies the distance threshold.

* * * * *